United States Patent Office 3,444,275
Patented May 13, 1969

3,444,275
METHOD OF MOLDING UTILIZING DIELECTRIC HEATING
John A. Willett, Wellesley, Mass., assignor to W. R. Grace & Co., Cambridge, Mass., a corporation of Connecticut
Filed Aug. 19, 1966, Ser. No. 573,638
Int. Cl. B29c 3/00
U.S. Cl. 264—26      2 Claims

ABSTRACT OF THE DISCLOSURE

Printing plates are molded from R.F. heated thermoplastics. Pressure in enclosure surrounding matrix and thermoplastic is reduced to at least 15 mm. of mercury before heating begins. Heating is stopped and press is closed to full molding pressure which is maintained until fluid-cooled platens chill the plate to its "memory point."

---

This invention relates to an improved method for molding various materials, especially thermoplastic materials.

Through the years various types of machinery and methods have been devised to accomplish the molding of moldable materials. Included among such equipment are presses hydraulically operated with platents heated electrically or by steam. While such have been satisfactory to a considerable extent, they have suffered the disadvantage of a prolonged time cycle due to the conductive heating of the workpiece.

More recently dielectric heating and molding equipment has been employed because of its more rapid heating and molding cycle time. One difficulty experienced in employing such equiment with plastic materials has been that the materials had to be of rather precise formulation in order to accomplish a good molded product without fissures, air or gas entrapment, and the like. This is especially critical in the instance where the material molded is to be used as a printing plate. As is well known, printing plates must result in sharpness of characters as well as experience a long life. Additionally, in the absence of carefully controlled formulations, erratic results have been obtained when attempts to employ presently known dielectric heating and molding presses have been made to the extent that complete melting, scorching, fouling of the equipment, blisters, and many other deficiencies have resulted. These and other disadvantages again cannot be tolerated in the very precise requirements in the printing plate industry. Other disadvantages of the prior art will be evident to those skilled in the art.

Accordingly, it is an object of this invention to provide a novel method for molding moldable materials, especially thermoplastic materials in printing plate form. These and other objects will be evident as the discussion proceeds.

It has now been discovered that a more accurate molding employing a dielectric heating during the molding can be obtained if the object to be molded is maintained under a vacuum throughout the molding cycle and the external surfaces of the molded material are continuously cooled during the molding cycle and the application of the radio frequency current. It has now been found that better molded products are obtained in this manner than have been available heretofore. This has been particularly demonstrated in the printing plate art where the use of the method and apparatus of this invention has resulted in thermoplastic printing plates made from varying compositions having a longer wear life than commercial rubber printing plates and even thermoplastic plates made employing dielectric heating molds of the type known heretofore.

In order that the invention may be better understood, reference is made to the accompanying drawings wherein.

Figure 1:
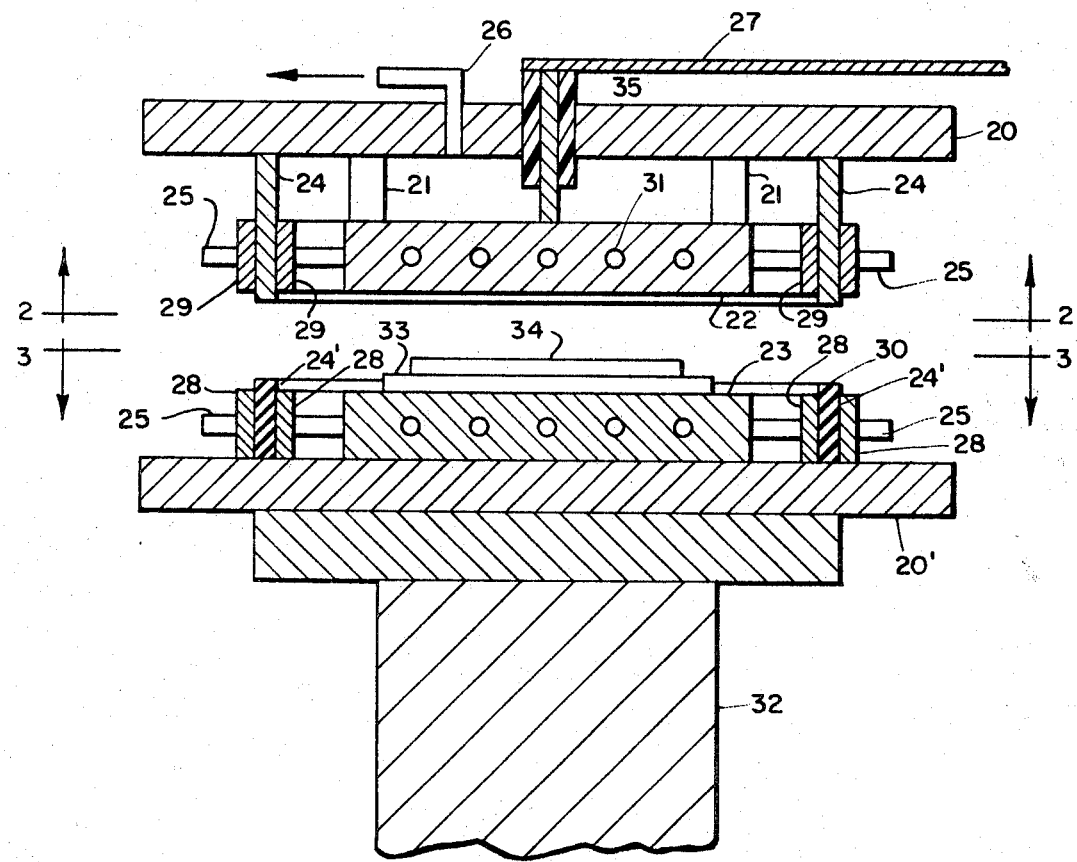
FIG. 1 is an elevated, centerline, cross-sectional view of the molding apparatus.
Figure 2:
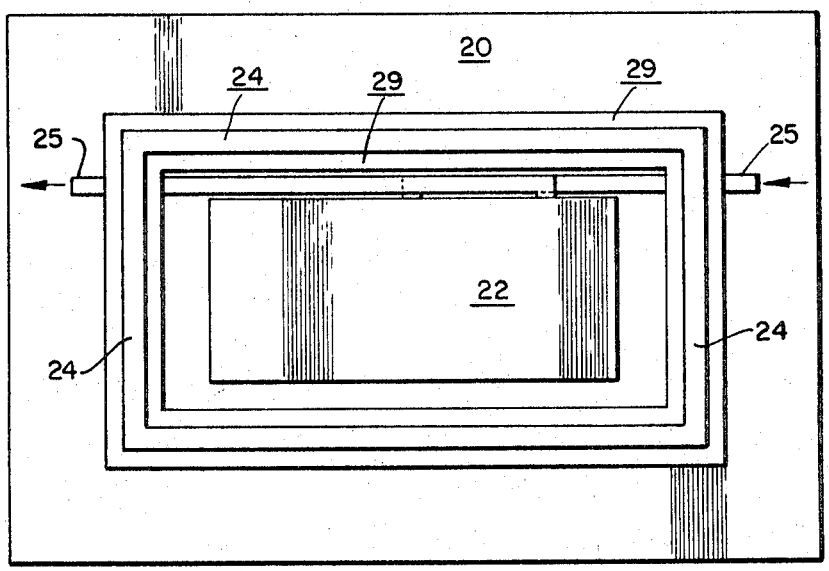
FIG. 2 is a view looking up along the line 2—2.
Figure 3:
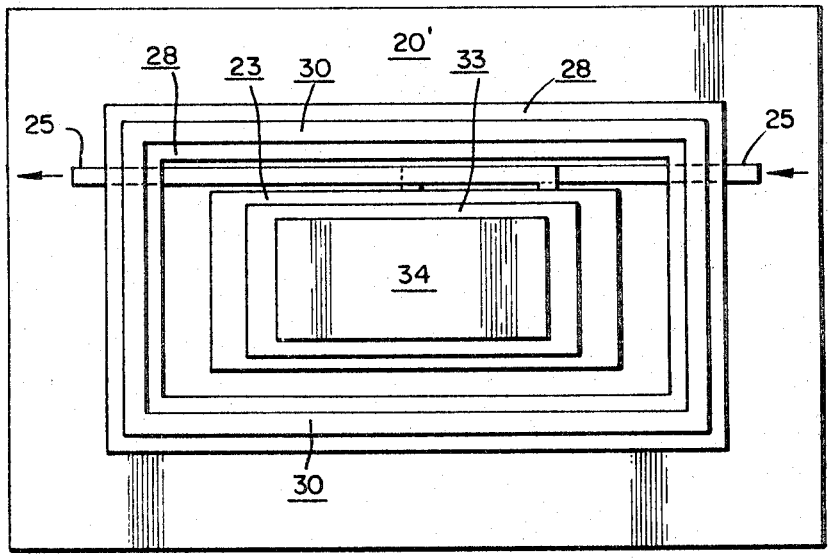
FIG. 3 is a view looking down along the line 3—3.

The molding press designated in the accompanying drawings can form a part of any of the well-known dielectric heating and molding systems with the auxiliary equipment such as the radio frequency current generator, the hydraulic systems, automatic timers, and relay systems being used as is well known in the art. The present invention is directed primarily to the novel molding press set forth in the attached drawings.

Referring to the drawings, there is provided a base and header plates 20. The top or live electrode or platen 22 is isolated from the ground by insulators 21 attached to the top header plate 20. The other electrode or platen 23 is supported upon the base plate 20' by suitable means. Attached to the base plate 20' and header plate 20 are vacuum chamber walls 24 and 24'. On the upper edge of chamber walls 24' are vacuum seals 30 suitably made of a rubber material or, as depicted, the entire wall 24' can be made of rubber. Platens 22 and 23 are cored as shown at 31 so that a coolant medium can be circulated throughout. The coolant is introduced into and drained from platens 22 and 23 by means of the vacuum sealed ports 25 passing through the vacuum chamber walls 24. The radio frequency transmission line 27 is introduced into the vacuum chamber through a vacuum sealed pass-through insulator 35. Air is evacuated after the seal is made between chamber walls 24 and 24' coming into contact pressure with vacuum seal 30 by means of a vacuum port 26 and a conventional vacuum pump and tubing, not shown. To control the distance finally achieved between the platens, bearer stops 29 and bearer supports 28 are provided. The base plate 20' is supported on hydraulic ram 32 which is actuated by a typical hydraulic ram system.

To further illustrate the apparatus and the method of this invention, a mold or matrix 33 with a sheet of moldable polymeric composition 34 is placed in position on the lower or ground platen 23. A conventional recylcling programmer is actuated which starts the molding cycle.

The vacuum system 26 is turned on and the hydraulic ram 32 controlled by the programmer starts upward until the polymeric composition sheet 24 comes into contact with the upper platen 22. At this point a pressure-sensitive switch in the hydraulic line (not shown) holds the hydraulic ram in this position at minimum or essentially 0 contact pressure. At the same time the vacuum chamber wall 24 has come into contact with the rubber vacuum seal and evacuation of the chamber thus formed takes place.

By the time the polymeric composition sheet 34 has come into contact with the uper platen 22, the chamber has been evacuated to 15 inches of mercury. The platens 22 and 23 are kept chilled to 40° F. at all times, by water, or other heat transfer means, circulating through ports 25.

As soon as the polymeric composition sheet 34 contacts the upper platen 22, the RF field 27 is turned on and maintained for a predetermined length of time, usually ten seconds. At the end of the RF 27 heating cycle, the hydraulic ram 32 is reactivated and the final travel of the lower platen 23 brings the bearers (with gauge control shims, not shown) into tight contact between the bearer supports 28 and the bearer stops 29. (Bearer shims of the proper thickness are suitably placed on the bearer support 28 and left there unless a different plate thickness is desired.)

The hydraulic ram 32 holds the platens 22 and 23 with the matrix, or mold, 33 and the polymeric composition sheet 34 under pressure for the remainder of the programmer controlled cycle (60 seconds). Thus, the programmed cycle allots 2 seconds for closing to contact pressure, 10 seconds for RF heating, and the balance of 60 seconds, or about 48 seconds, for chilling.

This is sufficient time to transfer all heat from the molten and molded polymeric composition sheet, returning it to a cool, or memory state. At the end of the chilling phase of the cycle, the press automatically returns to the home, or open position, and the charge, matrix or mold 33 and the polymeric composition sheet 34 are removed. The press is then ready to repeat the cycle after reloading.

The apparatus and method of the present invention are particularly useful in the printing field to produce printing plates in a more efficient manner and of better quality than possible heretofore. It is to be particularly noted that the continuous cooling of each face of the material to be molded is quite important since it is chilled to a memory state while still under pressure. This results in a flat, nonshrinking and noncurling plate of the proper gauge in the instance of making printing plates. Another particular advantage of the apparatus and method is that very little pressure is required whereas by the prior art techniques very high pressures have been used. Likewise, maintaining the workpiece under a vacuum during the entire molding operation serves a number of vital purposes. In conventional molding presses, air is entrapped in the depressed characters of the mold or matrix which is then put under pressure as the platens close. The result is a flaw in the molded article wherever this occurs. Additionally, as a plastic material melts, a certain amount of gas is generated, commonly referred to as "gas-out." This problem is obviated by the present invention in that the gas is removed as fast as it it generated. The gas can cause the same sort of defect in the molded article as caused by entrapped air if it is not removed. Still further advantage is obtained by virtue of the fact that less pressure needs to be exerted between the platens. Another advantageous feature is that by the removal of the air from the system the entire radio frequency field is channeled through the dielectric material and the tendency toward arcing is reduced since there is no absorbing medium other than the dielectric material in contact with the electrodes.

The present apparatus and method can be employed in molding various moldable materials. It is especially useful in molding sheet materials having a differential dielectric loss from one face of the sheet to the other. Particularly preferred materials in this category are described in my copending application S.N. 573,636 filed of even date herewith, the disclsoure of which is incorporated herein.

What is claimed is:

1. In a dielectric heating and molding process wherein the material to be molded is positioned between two electrodes connected to the output of a source of high frequency electric energy, the improvement which comprises continuously moving the electrodes toward each other while simultaneously drawing a vacuum on the system and continuously cooling the electrodes until the upper surface of the material to be molded makes contact with the upper electrode, maintaining the upper electrode in contact with the material at essentially 0 pressure, instantaneously actuate the high frequency electric energy and maintaining such for a period of about 10 seconds thereby rendering the face of the material to be molded molten, and then actuating the electrodes to move further together until they reach a predetermined distance between each other.

2. The method of forming printing plates and the like, which includes providing the movable element of a molding press with a fluid-cooled platen, surrounding the side walls of said platen with an impermeable wall, connecting the said platen to one terminal of a radio frequency transmission line, providing the fixed element of a press with an insulated fluid-cooled platen surrounded by an impermeable wall, one of said walls bearing sealing means adapted when the press is closed, to contact the opposing wall and form a sealed enclosure, connecting the said insulated platen to the opposite terminal of a radio frequency transmission line causing cooling fluid to flow through both of said platens, placing a matrix on said movable platen, superposing a sheet of a moldable polymeric composition on the said matrix and then closing the press with a pressure no more than sufficient to form a tight seal between the upper and lower walls surrounding said platens, then exhausting the air in the enclosed space to a pressure at least as low as 15 inches of mercury, then energizing the radio frequency transmission lines with R.F. current for a time sufficient to convert the said polymeric composition into a moldable mass, stopping the heating and closing the press, further compressing the resilient wall to force the molding composition into complete contact with the entire matrix surface and maintaining the pressure until the said polymeric composition is cooled to a rigid state.

References Cited

UNITED STATES PATENTS

| | | | |
|---|---|---|---|
| 1,190,072 | 7/1916 | Aiken | 264—102 |
| 1,806,846 | 5/1931 | Fox et al. | |
| 2,354,714 | 8/1941 | Strickland. | |
| 2,513,785 | 7/1950 | Browne | 264—102 X |
| 2,586,996 | 2/1952 | Rosenthal | 219—10.81 X |
| 2,617,752 | 11/1952 | Von Hauteville | 219—10.49 X |
| 2,978,376 | 4/1961 | Hulse | 264—102 X |

FOREIGN PATENTS

| | | |
|---|---|---|
| 589,624 | 6/1947 | Great Britain. |
| 611,422 | 10/1948 | Great Britain. |

ROBERT F. WHITE, *Primary Examiner.*

T. J. CARVIS, *Assistant Examiner.*

U.S. Cl. X.R.

219—10.49, 10.81; 264—102, 327